United States Patent Office 2,923,734
Patented Feb. 2, 1960

2,923,734
PREPARATION OF SULFO ESTERS OF
α-METHYLENE CARBOXYLIC ACIDS

David P. Sheetz, Midland, Mich., assignor to The Dow Chemical Company, Midland, Mich., a corporation of Delaware No Drawing. Application March 25, 1957
Serial No. 647,952

13 Claims. (Cl. 260—486)

This invention pertains to an improved method for the preparation of sulfo esters of α-methylene carboxylic acids with aliphatic hydroxy sulfonic acids.

In a pending application, Serial No. 647,974, filed concurrently herewith by Walter J. LeFevre and David P. Sheetz, there are described new sulfo esters of a α-methylene carboxylic acids, i.e. esters of α-methylene carboxylic acids and hydroxy sulfonic acids, such as 2-sulfoethyl acrylate and 2-sulfoethyl methacrylate. The application referred to discloses that such esters can be made by interaction of α-methylene carboxylic acyl halides such as acryloyl chloride and hydroxy sulfonic acid salts such as sodium isethionate. In instances where the hydroxy sulfonic acid is an aliphatic hydroxy sulfonic acid, the reaction thereof with an acyl halide such as acryloyl chloride results in the formation of a hydrogen halide such as hydrogen chloride. In most such instances, a part of the hydrogen halide so formed reacts with the unsaturated linkage in the α-methylene carboxylic acid acyl halide or ester product, thereby forming a β-halocarboxylic acid derivative as a by-product and diminishing the yield of the α-methylene carboxylic acid ester product.

It is an object of this invention to provide an improved method for preparing sulfo esters of α-methylene carboxylic acids.

A more specific object is to prepare esters of α-methylene carboxylic acids and aliphatic hydroxy sulfonic acids.

Another object is to prepare such esters in good yield and purity.

Still other objects and advantages of the invention will be evident in the following description.

The objects of this invention have been attained in a method of direct esterification wherein an α-methylene carboxylic acid and an aliphatic hydroxy sulfonic acid in the free-acid form are interacted by heating together, optionally while dispersed in an inert liquid medium capable of forming an azeotrope with water and while azeotropically distilling water out of the reaction mixture, to form the corresponding carboxylate ester.

The α-methylene carboxylic acids with which this invention is concerned are those having the formula

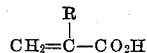

wherein the symbol R represents hydrogen, a halogen such as chlorine, or an organic radical such as an alkyl radical.

Specific examples of α-methylene carboxylic acids that are suitable starting materials are Acrylic acid
Methacrylic acid
α-Ethylacrylic acid
α-Propylacrylic acid
α-Butylacrylic acid
α-Pentylacrylic acid α-Hexylacrylic acid
Atropic acid
α-Cyclohexylacrylic acid
α-Furylacrylic acid
α-Chloroacrylic acid The aliphatic hydroxy sulfonic acids with which this invention is concerned are those having the formula

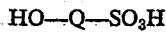

wherein the symbol —Q— represents a bivalent organic radical in which the HO— radical is attached to an aliphatic carbon atom, such as the hydroxyalkanesulfonic acids.

Specific examples of such aliphatic hydroxy sulfonic acids that are suitable starting materials are 2-hydroxyethanesulfonic acid (isethionic acid)
2-hydroxy-1-propanesulfonic acid
1-hydroxy-2-propanesulfonic acid
2-hydroxy-1-butanesulfonic acid
1-hydroxy-2-butanesulfonic acid
3-hydroxy-2-butanesulfonic acid
1-hydroxy-2-methyl-2-propanesulfonic acid
2-hydroxy-2-methyl-1-propanesulfonic acid
3-bromo-1-hydroxy-2-propanesulfonic acid
3-bromo-2-hydroxy-1-propanesulfonic acid
3-chloro-1-hydroxy-2-propanesulfonic acid
3-chloro-2-hydroxy-1-propanesulfonic acid
1-bromo-2-hydroxy-3-butanesulfonic acid
1-bromo-3-hydroxy-2-butanesulfonic acid
1-chloro-2-hydroxy-3-butanesulfonic acid
1-chloro-3-hydroxy-2-butanesulfonic acid
3-bromo-1-hydroxy-2-butanesulfonic acid
3-bromo-2-hydroxy-1-butanesulfonic acid
3-chloro-1-hydroxy-2-butanesulfonic acid
3-chloro-2-hydroxy-1-butanesulfonic acid
1-chloro-2-hydroxy-2-methyl-3-propanesulfonic acid
1-chloro-3-hydroxy-2-methyl-2-propanesulfonic acid
1-chloro-2-(chloromethyl)-2-hydroxy-3-pronanesulfonic acid
1-chloro-2-(chloromethyl)-3-hydroxy-2-propanesulfonic acid
1-hydroxy-3-methoxy-2-propanesulfonic acid
2-hydroxy-3-methoxy-1-propanesulfonic acid
2-hydroxycyclohexanesulfonic acid
2-hydroxy-2-phenylethanesulfonic acid
2-hydroxy-1-phenylethanesulfonic acid
2-bromo-3-hydroxy-2-methyl-3-phenyl-1-propanesulfonic acid
3-hydroxy-1-propanesulfonic acid
3-hydroxy-1-butanesulfonic acid
1-hydroxy-3-butanesulfonic acid
4-hydroxy-1-butanesulfonic acid
ar-(2-hydroxyethoxy)benzenesulfonic acid The term "sulfo ester" of an α-methylene carboxylic acid is used herein to mean a carboxylate ester of an α-methylene carboxylic acid and an aliphatic hydroxy sulfonic acid, e.g. an alcohol having a substitutent sulfo (—SO₃H) group, or salt thereof such as a sodiosulfo (—SO₃Na) group.

The sulfo esters are prepared according to this invention by heating a mixture comprising at least one α-methylene carboxylic acid and at least one aliphatic hydroxy sulfonic acid of the kinds described above. Usually, approximately stoichiometric proportions of the starting reactants are employed, although an excess of either, preferably an excess of the α-methylene carboxylic acid, can be used.

The reaction is carried out by heating a mixture of the starting α-methylene carboxylic acid and the starting aliphatic hydroxy sulfonic acid, preferably at a temperature of 50° C. or more, e.g. in the range from 50° to 200° C. Optionally, a polymerization inhibitor can be incorporated in the reaction mixture to minimize or prevent polymerization of the α-methylene carboxylic acid or its ester product. Suitable polymerization inhibitors are the phenolic inhibitors such as hydroquinone or p-methoxyphenol.

In some instances the starting materials, i.e. the α-methylene carboxylic acid and aliphatic hydroxy sulfonic acid, are not initially miscible but form a single liquid phase on heating and interacting. A mutual solvent can be used in the starting mixture, but this is usually not necessary. Simply heating the starting materials together causes a considerable proportion thereof to be converted to the corresponding sulfo ester, even without removing the water product from the reaction mixture. In instances where the starting mixture is substantially free of water, the reaction can often be carried out to 90 or more percent completion by heating without removal of water. In some such instances and for some purposes, the resulting reaction products can be employed directly or treated to isolate the sulfo ester product.

In some instances, e.g. when the starting reaction mixture contains water, the reaction mixture obtained by heating the starting mixture often contains substantial proportions of unreacted α-methylene carboxylic acid and aliphatic hydroxy sulfonic acid.

In instances where it is desirable to carry the reaction to substantial completion, an inert liquid capable of azeotroping water is added to the reaction mixture, and heating is continued to cause azeotropic distillation of at least a part of the added inert liquid and of the water from the esterification reaction mixture. Suitable such azeotroping agents are, for example, benzene, toluene, the xylenes, ethylbenzene, the ethyltoluenes, isopropylbenzene, chlorobenzene, o-dichlorobenzene, chlorotoluene, dichlorotoluene, chloroxylene, carbon tetrachloride, ethylene dichloride, propylene dichloride, and the like.

The inert liquids, capable of azeotropic distillation with water, can be added to the starting mixture of α-methylene carboxylic acid and aliphatic hydroxy sulfonic acid to serve as a reaction medium, usually in such quantity as will provide an easily stirred reaction mixture.

From the esterification reaction mixture, the sulfo ester can be isolated in usual ways. The inert liquid, if one were used, can be separated from the reaction mixture, e.g. by distillation, leaving the sulfo ester in free sulfonic acid form corresponding to the formula

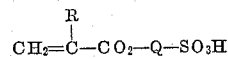

wherein the symbols have the meanings hereinbefore given.

The free sulfonic acid group can, of course, be converted to salt forms, e.g. by reaction thereof with base-acting materials such as alkali metal hydroxides, alkaline earth oxides or hydroxides, ammonium bases, basic salts thereof with weak acids, base-forming metals, and reactive metal oxides.

Usually the salt form of the sulfo ester is obtained from the reaction mixture by adding thereto a base-acting material, e.g. sodium hydroxide, sodium carbonate, or sodium bicarbonate, in amount stoichiometrically equivalent to the sulfonic acid groups or the sulfo ester product, and thereby forming the corresponding sulfonic acid salt.

The following examples illustrate the invention but are not to be construed as limiting its scope. In the examples, parts and percentages are by weight unless otherwise noted.

EXAMPLE 1.—PREPARATION OF 2-SULFOETHYL ACRYLATE AND ITS SODIUM SALT

Into a reaction vessel fitted with a stirrer and a reflux condenser with provision for withdrawing a portion of the condensate were charged 576 gms. of glacial acrylic acid, 569 grams of aqueous 87 percent by weight isethionic acid, and 4 grams of p-methoxyphenol (added as polymerization inhibitor). The mixture was vigorously stirred and heated to 70° C. whereupon the mixture became homogeneous. Eight hundred milliliters of benzene were added and the mixture was vigorously refluxed. The azeotropic distillate separated into two layers, a water layer which was withdrawn from the system, and a benzene layer which was returned to the reaction vessel. The distillation was continued for six hours during which 53 ml. of water was withdrawn. The cooled reaction mixture consisted of a syrupy liquid layer containing 2-sulfoethyl acrylate and a benzene layer, which was decanted from the syrup. This syrupy liquid was partially neutralized by addition thereto of 236 grams of sodium carbonate thereby converting the 2-sulfoethyl acrylate to the corresponding sodium salt and forming a pasty slurry. After addition of 80 ml. of water to the slurry, the resulting mixture was heated on steam to form a clear solution which was poured into 4 liters of methyl ethyl ketone forming a slurry which was then cooled to 10° C. The solid was collected by filtration, washed with methyl ethyl ketone, and dried to obtain 764 grams of a white crystalline product analyzing 90 percent 2-sodiosulfoethyl acrylate. The product melted at approximately 225° C. with immediate polymerization.

The 2-sodiosulfoethyl acrylate is very soluble in water, soluble in hot methanol, and practically insoluble in non-polar organic liquids.

The product was recrystallized from a methanol-water mixture, dried and analyzed with these results (percent by weight):

| | Found | Calculated for 2-sodio-sulfoethyl acrylate |
|---|---|---|
| Carbon | 29.43 | 29.7 |
| Hydrogen | 3.40 | 3.47 |
| Sulfur | 15.5 | 15.85 |

EXAMPLE 2.—SULFOPROPYL ACRYLATE AND SODIUM SALT

Into a reaction vessel fitted with a stirrer and reflux condenser with provision for withdrawing a portion of the condensate were charged 576 grams of acrylic acid, 604 grams of aqueous hydroxypropanesulfonic acid (containing 8 percent by weight of water and 92 percent by weight of a mixture of 1-hydroxy-2-propanesulfonic acid and 2-hydroxy-1-propanesulfonic acid), and 4 grams of p-methoxyphenol. The mixture was heated with stirring to 70° C., 800 mls. of benzene were added, and the resulting mixture was heated to reflux distillation. The azeotropic distillate separated into a water layer, which was withdrawn from the system, and a benzene layer, which was returned to the reaction mixture. The distillation was continued until 79 ml. of water had been withdrawn. After the reaction mixture had been cooled to room temperature, it was partially neutralized by slowly adding 240 grams of solid sodium carbonate and the mixture was heated on steam until all of the carbonate had dissolved, thereby forming the sodium salt of the sulfopropyl acrylate ester. Two liters of toluene was added and the mixture was vigorously stirred, then allowed to stand. A toluene layer was decanted from a heavy liquid layer and the latter was stirred with three liters of methyl ethyl ketone and allowed to stand. After the resulting mixture had been cooled to 0° C., it was filtered to obtain a white crystalline solid product which was washed with acetone and dried to yield 754 grams of a mixture of the sodium salts of 1-sulfo-2-propyl acrylate and 2-sulfo-1-propyl acrylate assaying 99 percent sodiosulfopropyl acrylate by saponification.

The elementary analyses were as follows (percent by weight):

| | Found | Calculated for sodio-sulfopropyl acrylate |
|---|---|---|
| Carbon | 32.87 | 33.3 |
| Hydrogen | 4.25 | 4.17 |
| Sulfur | 14.37 | 14.8 |

EXAMPLE 3.—2-SULFOETHYL METHACRYLATE AND SODIUM SALT

In a reaction vessel fitted with a stirrer and reflux condenser with provision for withdrawing a portion of the condensate, a mixture of 672 grams of methacrylic acid, 566 grams of aqueous isethionate acid (containing 11 percent by weight water and 89 percent by weight isethionic acid), and 4 grams of p-methoxyphenol was heated at 80° C. for 0.5 hour. After 800 ml. of benzene were added, the resulting mixture was heated at reflux distillation. The azeotropic distillate separated into two layers, the water layer being withdrawn from the system and the benzene layer being returned to the reaction mixture. The distillation was continued for approximately five hours until 85 ml. of water had been removed. After the reaction mixture had been cooled to room temperature, it was partially neutralized by slowly adding 230 grams of sodium carbonate. After 80 mls. of water had been added, the resulting mixture was heated on steam, until the carbonate dissolved, thereby forming the sodium salt of the 2-sulfoethyl methacrylate ester, whereupon the mixture was poured into two liters of acetone. Two liters of methyl ethyl ketone were added, and the resulting slurry was cooled to approximately 0° C. and was filtered. The white crystalline product was dried to obtain 719 grams of the sodium salt of 2-sulfoethyl methacrylate having an assay value (by saponification) of 92 percent by weight. The product melted at approximately 245° C. with immediate polymerization.

The 2-sodiosulfoethyl methacrylate was a white, crystalline solid that was very soluble in water, soluble in hot methanol, and insoluble in non-polar organic liquids. After recrystallization from a methanol-water mixture, the salt was analyzed with the following results in percent by weight:

|  | Found | Calculated for 2-sodiosulfoethyl methacrylate |
| --- | --- | --- |
| Carbon | 33.3 | 33.3 |
| Hydrogen | 4.15 | 4.16 |
| Sulfur | 14.5 | 14.8 |

The monomeric sulfo esters of α-methylene carboxylic acids are readily polymerized. Homopolymers are prepared by polymerizing individual monomeric sulfo esters, and copolymers are obtained by polymerizing mixtures of two or more of such monomeric esters. The polymerization can be carried out in mass, i.e. in the absence of diluents, in solution, or in dispersion in non-solvent liquid media. The polymerization is accelerated by heat, by activation with ionizing radiations, and by catalysts with free-radical catalysts such as peroxygen compounds, e.g. sodium or potassium persulfate and cumene hydroperoxide, and α,α'-azobisisobutyronitrile.

Homopolymeric 2-sodiosulfoethyl acrylate was prepared by the following procedure.

A solution of 50 grams of recrystallized 2-sodiosulfoethyl acrylate and 0.05 gram of potassium persulfate in 100 ml. of water was closed in a container under an atmosphere of nitrogen and agitated for one hour in a water bath at a temperature of 70° C. There was thereby obtained a viscous solution. Addition of methanol to the viscous aqueous solution precipitated a sticky mass which was collected and dried to a hard, brittle, white, solid resinous polymer of 2-sodiosulfoethyl acrylate. This polymer was very hygroscopic, soluble in water but insoluble or only slightly soluble in most organic liquids. Its water solutions are viscous and such solutions, when dried as a thin layer on a supporting surface, form clear films.

Homopolymeric 2-sodiosulfoethyl methacrylate was prepared as follows.

A mixture consisting essentially of:

20 ml. of water
10 grams of 2-sodiosulfoethyl methacrylate
0.001 gram of $(NH_4)_2S_2O_8$
0.001 gram of $K_2SO_3 \cdot 2H_2O$ was allowed to stand at room temperature for 24 hours forming a clear stiff gel of homopolymeric 2-sodiosulfoethyl methacrylate. Dilution of the gel with water produced a viscous solution.

The polymeric forms of the products of this invention are used as, and in the preparation of soil conditioners, stabilizers for aqueous colloidal dispersions and emulsions (such as polymer "latexes"), surface-active agents, antistatic finishes for textiles and plastics, adhesives, sizes for textiles and paper, and dye assistants. The monomeric forms of the products of this invention are used in similar ways and are particularly advantageous in being polymerizable during or after preparation of the desired composition or combination of ingredients.

One of the ways in which these sulfo esters can be used is illustrated in the following description.

A homopolymer of 2-sodiosulfoethyl acrylate was tested as an agent for improving the condition of agricultural soils. In this test, Miami silt loam soil, known to be subject of severe compaction and puddling in the field, was air-dried and sieved through a 10-mesh screen. A solution was prepared by dissolving 0.15 gram of homopolymeric 2-sodiosulfoethyl acrylate in 30 milliliters of water. The resulting solution was mixed with stirring with 300 grams of the dry, sieved soil to provide a soil composition containing 0.05 percent by weight of the homopolymeric 2-sodiosulfoethyl acrylate.

The treated portion of soil was placed in a standard soil tube having a 1.875-inch inside diameter, and was gently tamped to obtain a soil column of 6 inches' depth. The column so prepared was wetted with water to saturation and allowed to stand for 72 hours. Thereafter, a constant head of water was maintained over the soil column for 24 hours, and the rate of percolation of water through the soil column was determined. An untreated portion of the sieved Miami soil was wetted with water, placed in a soil tube, and subjected to the same percolation procedure as just described to serve as a control. The rates of percolation, in milliliters per hour, of water through these soil samples are shown in the table below.

Upon completion of the percolation determination just described, the soil samples were allowed to drain for 16 hours and were removed from the tubes. A 200-gram portion of each of the wet soil samples was placed on a standard 14-mesh sieve (Tyler sieve series) superimposed on a 32-mesh sieve. The sieve combination was then agitated for a period of about two minutes in a tank of water until all of the fine, non-aggregated soil was screened out. By this procedure, water-stable aggregates having diameters of 0.5 millimeter or greater were retained on the screens. These stable aggregates were allowed to drain for five minutes and were weighed. The amount of such stable aggregates, as percent by weight of the wet soil, are also shown in the table.

Table

| Soil Sample | Percolation Rate, ml./hr. | Stable Aggregates, Wt. percent |
| --- | --- | --- |
| Blank, control | 90 | 18.5 |
| 2-Sodiosulfoethyl acrylate, homopolymer | 886 | 28.5 |

In agricultural practice, the polymeric sulfo ester, such as the 2-sodiosulfoethyl acrylate homopolymer, is distributed over the surface of freshly fitted soil, normally subject to puddling and formation of hard crusts, and admixed with the upper layer of soil to a depth of three inches or thereabouts, e.g. by use of a disk and drag. Marked improvement of the soil texture and tilth results throughout the subsequent growing season.

I claim:
1. A method for preparation of sulfo esters which comprises esterifying by heating a mixture comprising a α-methylene carboxylic acid and an aliphatic hydroxy sulfonic acid at an esterification reaction temperature between 50° C. and 200° C. and recovering the resulting sulfoaliphatic ester of the α-methylene carboxylic acid.

2. A method according to claim 1 wherein the α-methylene carboxylic acid is acrylic acid.

3. A method according to claim 1 wherein the α-methylene carboxylic acid is methacrylic acid.

4. A method according to claim 1 wherein the aliphatic hydroxy sulfonic acid is isethionic acid.

5. A method according to claim 1 wherein the aliphatic hydroxy sulfonic acid is a hydroxypropanesulfonic acid.

6. A method according to claim 1 which comprises the further steps of adding to the reaction mixture an inert liquid capable of forming an azeotrope with water and subjecting the resulting mixture to distillation to obtain an azeotropic distillate comprising water.

7. A method according to claim 6 wherein the α-methylene carboxylic acid is acrylic acid.

8. A method according to claim 6 wherein the α-methylene carboxylic acid is methacrylic acid.

9. A method according to claim 6 wherein the aliphatic hydroxy sulfonic acid is isethionic acid.

10. A method according to claim 6 wherein the aliphatic hydroxy sulfonic acid is a hydroxypropanesulfonic acid.

11. A method which comprises forming a reaction mixture comprising isethionic acid, at least one weight mole of acrylic acid per weight mole of isethionic acid, and an inert liquid capable of forming an azeotrope with water in proportion making an easily stirred mixture, and forming 2-sulfoethyl acrylate by heating the resulting mixture at an esterification reaction temperature between 50° C. and 200° C. while azeotropically distilling water from the reaction mixture.

12. A method which comprises forming a reaction mixture comprising isethionic acid, at least one weight mole of methacrylic acid per weight mole of isethionic acid, and an inert liquid capable of forming an azeotrope with water in proportion making an easily stirred mixture, and forming 2-sulfoethyl methacrylate by heating the resulting mixture at an esterification reaction temperature between 50° C. and 200° C. while azeotropically distilling water from the reaction mixture.

13. A method which comprises forming a reaction mixture comprising a hydroxypropanesulfonic acid, at least one weight mole of an α-methylene carboxylic acid per weight mole of the hydroxypropanesulfonic acid, and an inert liquid capable of forming an azeotrope with water in proportion making an easily stirred mixture, and forming a sulfopropyl α-methylene carboxylate by heating the resulting mixture at an esterification reaction temperature between 50° C. and 200° C. while azeotropically distilling water from the reaction mixture.

References Cited in the file of this patent

UNITED STATES PATENTS

| | | |
|---|---|---|
| 1,881,172 | Daimler et al. | Oct. 4, 1932 |
| 2,812,267 | Garner et al. | Nov. 5, 1957 |